(12) United States Patent
Goda

(10) Patent No.: US 12,117,552 B2
(45) Date of Patent: *Oct. 15, 2024

(54) RADAR DEVICE

(71) Applicant: Mitsubishi Electric Corporation, Tokyo (JP)

(72) Inventor: Yuichi Goda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 253 days.

This patent is subject to a terminal disclaimer.

(21) Appl. No.: 17/342,111

(22) Filed: Jun. 8, 2021

(65) Prior Publication Data

US 2022/0018928 A1    Jan. 20, 2022

Related U.S. Application Data

(62) Division of application No. 16/016,975, filed on Jun. 25, 2018, now Pat. No. 11,061,109.

(30) Foreign Application Priority Data

Dec. 22, 2017    (JP) .................................. 2017-246115

(51) Int. Cl.
  *G01S 13/42*    (2006.01)
  *G01S 7/02*    (2006.01)
  (Continued)

(52) U.S. Cl.
  CPC .............. *G01S 7/023* (2013.01); *G01S 7/288* (2013.01); *G01S 7/352* (2013.01); *G01S 13/42* (2013.01);
  (Continued)

(58) Field of Classification Search
  CPC .... G01S 13/42; G01S 13/4454; G01S 13/931; G01S 7/023; G01S 7/288; G01S 7/2883;
  (Continued)

(56) References Cited

U.S. PATENT DOCUMENTS 8,665,137 B2 *  3/2014  Wintermantel ....... G01S 13/343
                                                342/188
11,061,109 B2 *  7/2021  Goda ..................... G01S 7/023
                  (Continued)

FOREIGN PATENT DOCUMENTS

JP        11-287857 A    10/1999
JP     2011-526373 A    10/2011
                  (Continued)

OTHER PUBLICATIONS

Communication dated Jan. 8, 2019, from the Japanese Patent Office in counterpart application No. 2017-246115.

*Primary Examiner* — Timothy A Brainard
(74) *Attorney, Agent, or Firm* — Sughrue Mion, PLLC; Richard C. Turner

(57) ABSTRACT

In a radar device (1), when a distance determined based on a range of fields of view required of the radar device (1) is defined as a distance d, transmission antennas (Tx) are arranged side by side with an antenna interval that is larger than the distance d in a first array direction, which is perpendicular to an emission direction of a transmission signal, reception antennas (Rx) are arranged side by side at antenna intervals that are larger than the distance d in a second array direction, which is parallel to the first array direction, and the transmission antennas (Tx) and the reception antennas (Rx) form virtual reception antennas (VR), which have an antenna arrangement including at least one part in which a virtual antenna interval is the distance d or less.

5 Claims, 11 Drawing Sheets

(51) Int. Cl.
  *G01S 7/288* (2006.01)
  *G01S 7/35* (2006.01)
  *G01S 13/931* (2020.01)
  *H01Q 1/32* (2006.01)
  *H01Q 9/04* (2006.01)
  *H01Q 21/06* (2006.01)
  *G01S 13/44* (2006.01)

(52) U.S. Cl.
  CPC ......... *G01S 13/931* (2013.01); *H01Q 1/3233* (2013.01); *H01Q 9/0407* (2013.01); *H01Q 21/065* (2013.01); *G01S 7/2883* (2021.05); *G01S 7/356* (2021.05); *G01S 13/4454* (2013.01)

(58) Field of Classification Search
  CPC . G01S 7/352; G01S 7/356; H04L 2012/5625; H04L 41/0213; H04L 41/0672; H04L 41/0803; H04L 41/0866; H04L 41/22; H01Q 1/3233; H01Q 21/065; H01Q 9/0407; G06V 30/40
  See application file for complete search history.

(56) References Cited

U.S. PATENT DOCUMENTS

| | | | |
|---|---|---|---|
| 2016/0033632 A1* | 2/2016 | Searcy | G01S 13/424 342/153 |
| 2017/0082730 A1* | 3/2017 | Kishigami | H01Q 21/061 |
| 2019/0067835 A1 | 2/2019 | Kishigami et al. | |
| 2019/0115670 A1 | 4/2019 | Kishigami | |

FOREIGN PATENT DOCUMENTS

| | | |
|---|---|---|
| JP | 5602275 B1 | 10/2014 |
| JP | 2016-003873 A | 1/2016 |
| JP | 2016-180720 A | 10/2016 |
| JP | 2017-534881 A | 11/2017 |

* cited by examiner

RADAR DEVICE

CROSS-REFERENCE TO RELATED APPLICATIONS

The present application is a divisional of U.S. application Ser. No. 16/016,975 filed Jun. 25, 2018, claiming priority based on Japanese Patent Application No. 2017-246115 filed Dec. 22, 2017, the contents of all of which are incorporated herein by reference in their entirety.

BACKGROUND OF THE INVENTION

1. Field of the Invention

The present invention relates to a radar device, and more particularly, to a radar device to be mounted on a moving object.

2. Description of the Related Art

Examples of a related-art radar device include a radar device described in Japanese Patent Translation Publication No. 2011-526373. The structure and operation of the related-art radar device described in Japanese Patent Translation Publication No. 2011-526373 are as follows.

The related-art radar device described in Japanese Patent Translation Publication No. 2011-526373 is configured to detect an object around a motor vehicle. Transmission means formed of at least one transmitter antenna emits a transmission signal toward the object. Moreover, receiving means formed of at least one receiver antenna receives the transmission signal reflected by the object. Signal processing means processes a received signal received by the receiving means.

The received signal is acquired by different combinations of transmitter antennas and receiver antennas. A relative phase center, which is defined as a sum of a vector from a reference point to a phase center of a transmitter antenna and a vector from the reference point to a phase center of a receiver antenna, is determined for each combination.

At that time, the transmitter antennas have at least approximately the same emission characteristics. Similarly, the receiver antennas have at least approximately the same emission characteristics. It should be noted, however, that the emission characteristics of the transmitter antennas and the emission characteristics of the receiver antennas may be different.

At this time, it is assumed that a spatial direction S is a direction that runs perpendicular to a spatial direction R. The spatial direction S is a vertical direction, for example, and the spatial direction R is a horizontal direction, for example. Now, with regard to positions of the relative phase centers, consideration is given to the combinations of the transmitter antennas and the receiver antennas that are defined in the spatial direction R. In this case, the positions of the relative phase centers of the combinations of the transmitter antennas and the receiver antennas vary periodically with a period length P.

Moreover, a phase portion of the received signal from the object alternates with the period length P depending on an angular position of the received signal in the spatial direction S. Therefore, the phase portion may be used to represent a position of the object in the spatial direction S.

In the related-art radar device described in Japanese Patent Translation Publication No. 2011-526373 described above, when antenna intervals between the antennas are short on a board on which the antennas are mounted, leakage of the transmission signal or the received signal occurs.

As a result, the related-art radar device of Japanese Patent Translation Publication No. 2011-526373 has a problem in that an error between channels may occur in amplitude or phase.

Meanwhile, when the antenna intervals between the antennas are long, the occurrence of the channel error in amplitude and phase is suppressed. However, when the antenna intervals between the antennas become longer, there is a problem in that a range of fields of view of the radar device becomes narrower.

SUMMARY OF THE INVENTION

The present invention has been made to solve the above-mentioned problems, and therefore has an object to provide a radar device, which is configured to reduce an error between channels in amplitude or phase while securing a range of fields of view required of the radar device.

According to one embodiment of the present invention, there is provided a radar device including: a plurality of transmission antennas, each of which is configured to emit a transmission signal toward an object in surroundings; a plurality of reception antennas, each of which is configured to receive the transmission signal reflected by the object to output the received transmission signal as a reception signal; and a signal processor, which is configured to process the reception signal output from each of the plurality of reception antennas, wherein, when a distance determined based on a range of fields of view required of the radar device is defined as a distance d: of the plurality of transmission antennas, at least two transmission antennas are arranged side by side with an antenna interval that is larger than the distance d in a first array direction, which is perpendicular to an emission direction of the transmission signal; the plurality of reception antennas are arranged side by side at antenna intervals that are larger than the distance d in a second array direction, which is perpendicular to the emission direction and is parallel to the first array direction; and the plurality of transmission antennas and the plurality of reception antennas form virtual reception antennas, and the virtual reception antennas have an antenna arrangement including at least one part in which a virtual antenna interval is the distance d or less.

The radar device according to the present invention has a configuration capable of achieving an antenna arrangement in which, while the antenna intervals between the transmission antennas and between the reception antennas are set to be larger than the distance d, the virtual antenna intervals between the virtual reception antennas is set to be the distance d or less. As a result, there can be provided the radar device, which is configured to reduce the error between channels in amplitude or phase while securing the range of fields of view required of the radar device.

DESCRIPTION OF THE EMBODIMENTS

First Embodiment

Now, a radar device according to a first embodiment of the present invention is described with reference to the drawings. Configurations and operations of respective parts, and a mounting relationship between respective components of a radar device 1 according to the first embodiment are described with reference to FIG. 1 to FIG. 6.

Figure 1:
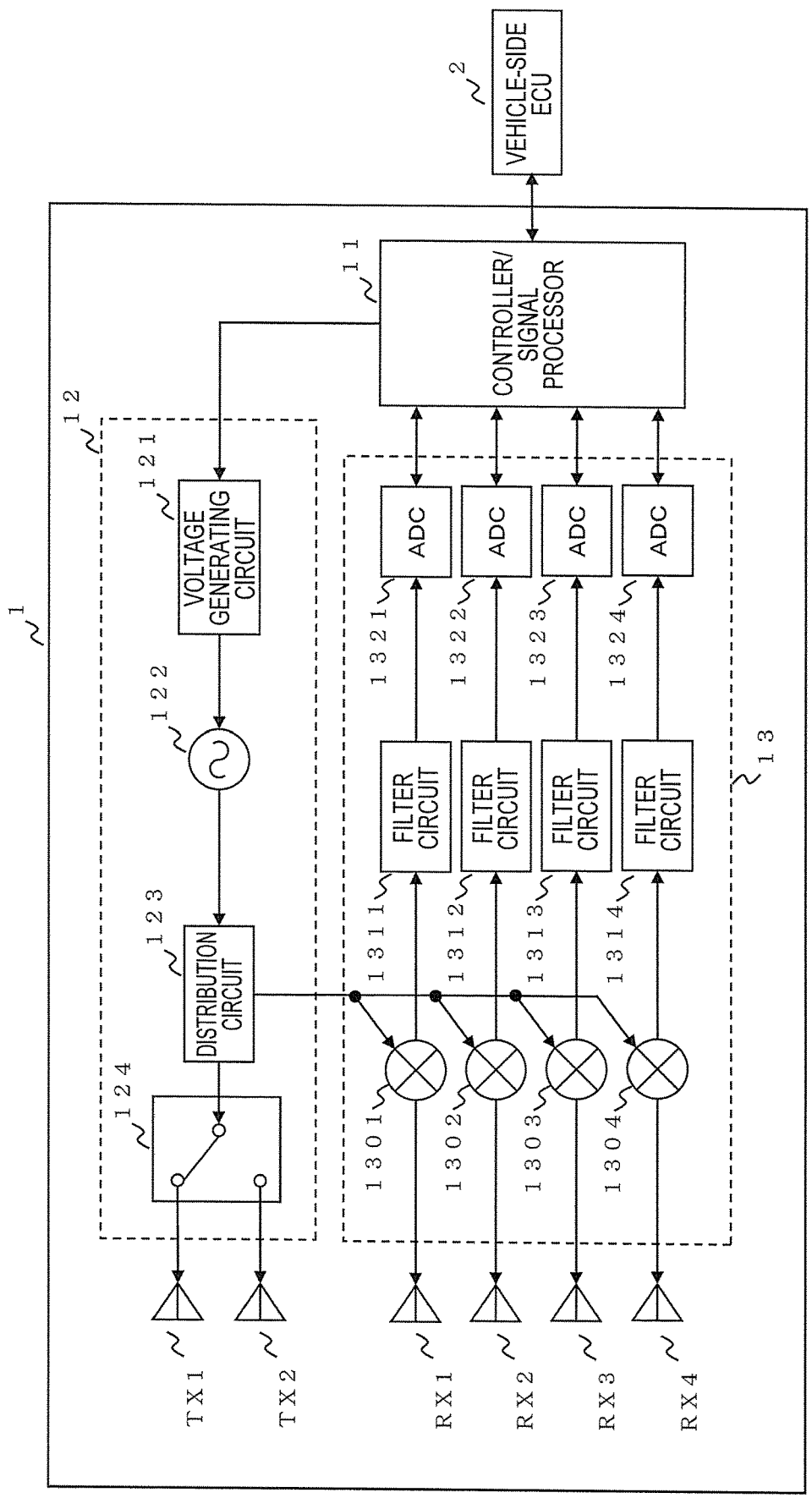
FIG. 1 is a block diagram for illustrating a configuration of a radar device according to a first embodiment of the present invention.
Figure 2:
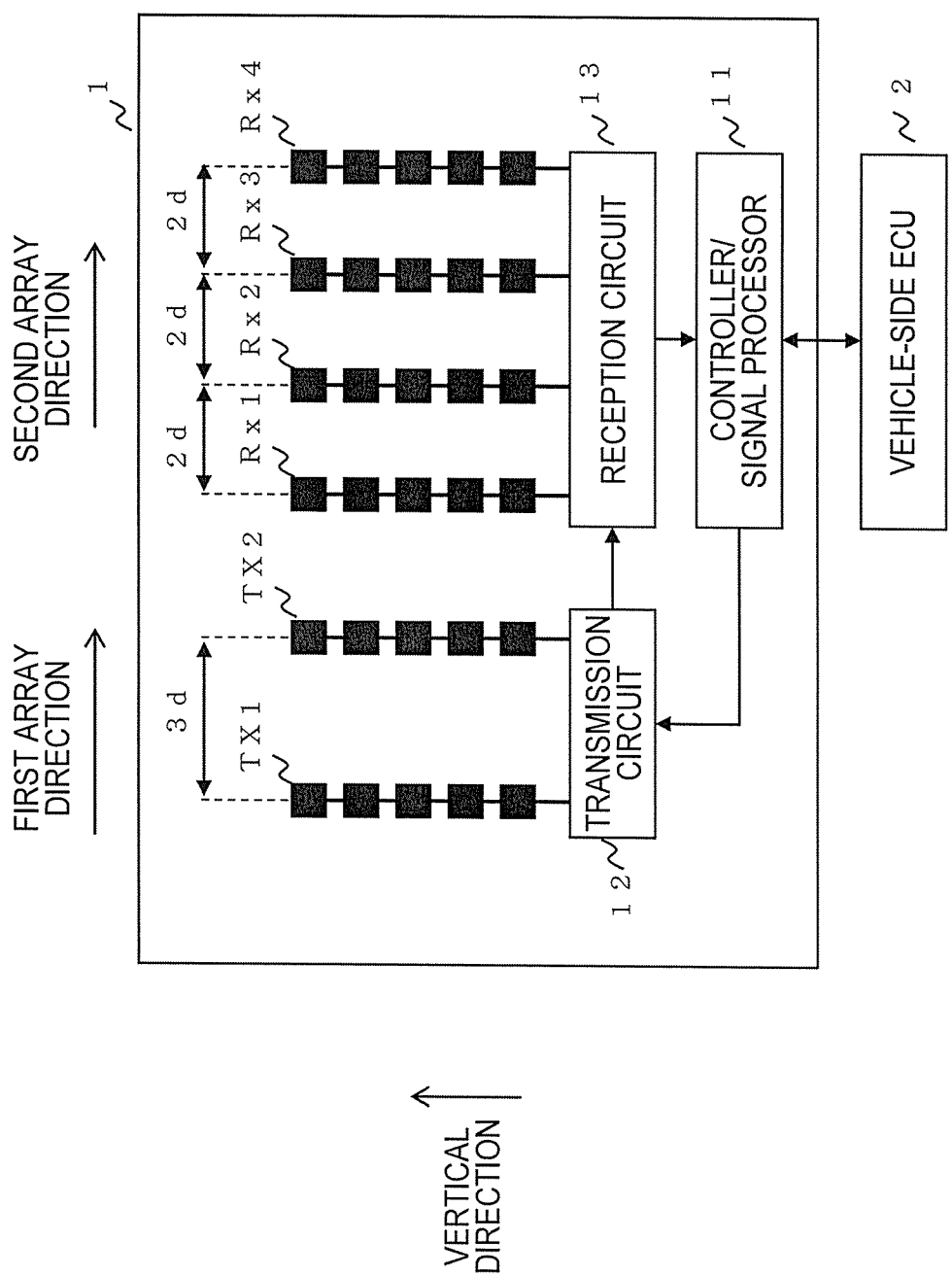
FIG. 2 is a diagram for illustrating an antenna arrangement of transmission antennas and reception antennas of the radar device according to the first embodiment of the present invention.
Figure 3:
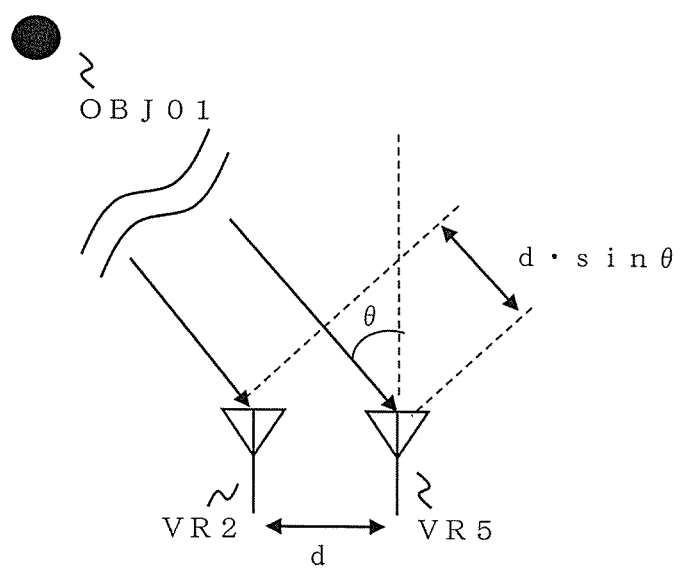
FIG. 3 is an explanatory diagram for illustrating an angle measurement method in the radar device according to the first embodiment of the present invention.
Figure 4:
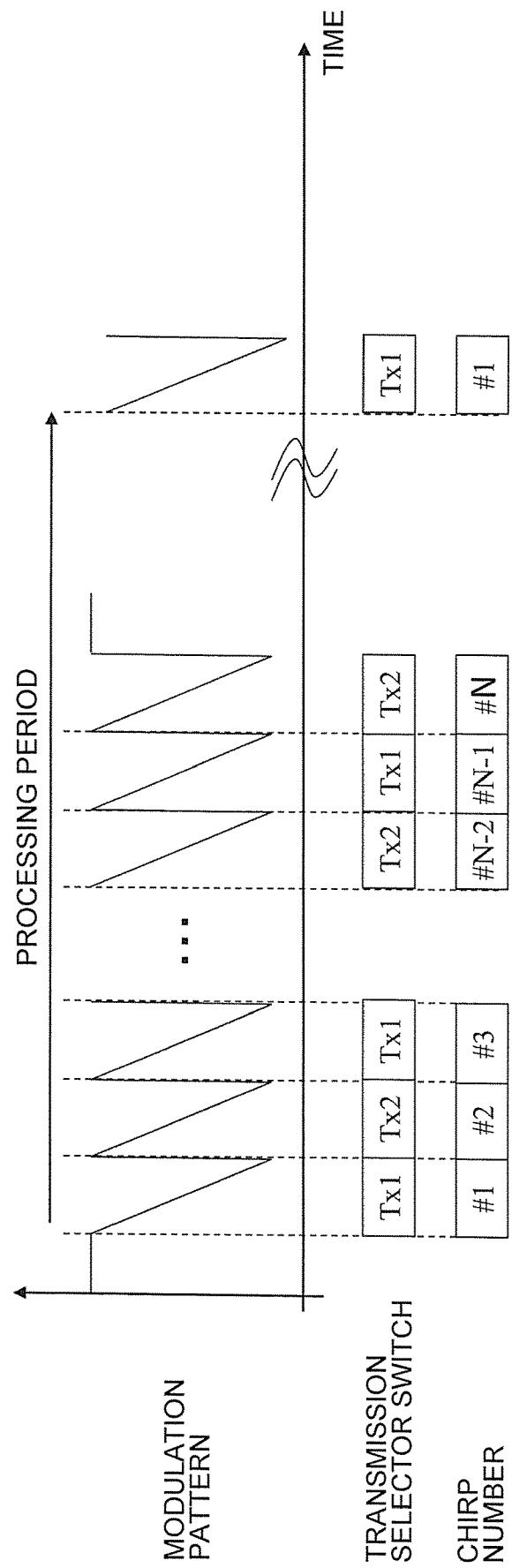
FIG. 4 is an explanatory chart for illustrating an example of a modulation pattern in the radar device according to the first embodiment of the present invention.
Figure 5:
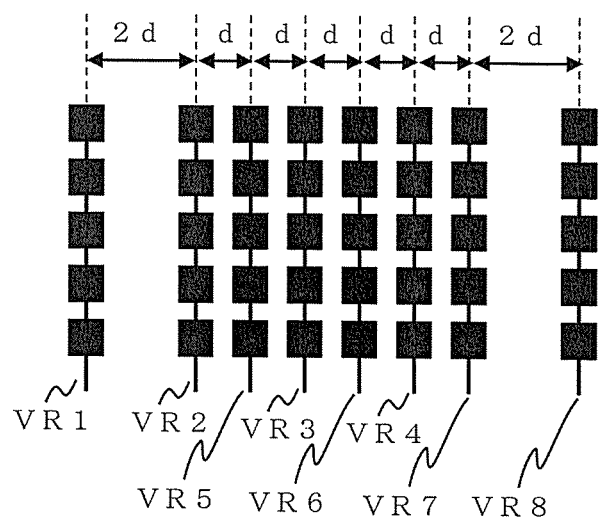
FIG. 5 is a diagram for illustrating an antenna arrangement of virtual reception antennas of the radar device according to the first embodiment of the present invention.
Figure 6:
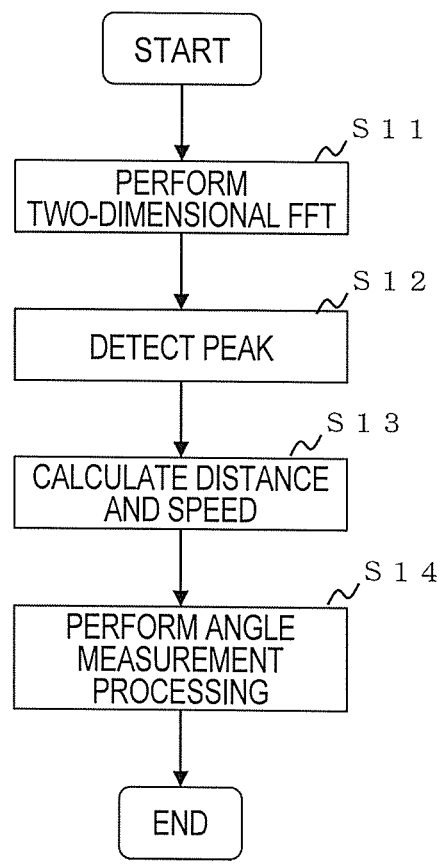
FIG. 6 is a flow chart for illustrating a processing flow of the radar device according to the first embodiment of the present invention.

FIG. 1 is a block diagram for illustrating a configuration of the radar device according to the first embodiment. FIG. 2 is a diagram for illustrating an antenna arrangement of the radar device according to the first embodiment. FIG. 3 is an explanatory diagram for illustrating an angle measurement method in the radar device according to the first embodiment of the present invention. FIG. 4 is an explanatory chart for illustrating a modulation pattern in the radar device according to the first embodiment of the present invention. FIG. 5 is a diagram for illustrating an antenna arrangement of virtual reception antennas of the radar device according to the first embodiment of the present invention. FIG. 6 is a flow chart for illustrating a processing flow of the radar device according to the first embodiment of the present invention. Throughout the figures, the same or corresponding configurations are denoted by the same reference symbols, and duplicate description is omitted.

In the first embodiment, as illustrated in FIG. 1, the radar device 1 includes a controller/signal processor 11, a transmission circuit 12, a reception circuit 13, a plurality of transmission antennas Tx1 and Tx2, and a plurality of reception antennas Rx1, Rx2, Rx3, and Rx4. In the following, the transmission antennas Tx1 and Tx2 are collectively referred to as the "transmission antennas Tx", and similarly, the reception antennas Rx1, Rx2, Rx3, and Rx4 are collectively referred to as the "reception antennas Rx".

The radar device 1 is mounted on a moving object. When the moving object is a vehicle, the radar device 1 is connected to a vehicle-side electronic control unit (ECU) 2.

In the first embodiment, as illustrated in FIG. 1, a case in which the number of transmission antennas Tx is two, and the number of reception antennas Rx is four is given as an example. However, the radar device of the present invention is applicable to any configuration as long as the configuration includes two or more transmission antennas Tx and two or more reception antennas Rx. Therefore, the numbers of transmission antennas Tx and reception antennas Rx may each be any number of two or more.

With the configuration illustrated in FIG. 1, the radar device 1 emits a transmission signal generated in the transmission circuit 12 from the transmission antenna Tx1 or Tx2 toward a target object. The transmission signal is reflected by the target object. The reflected signal is received by the reception antennas Rx. The received signal is input as a reception signal to the controller/signal processor 11 via the reception circuit 13. The controller/signal processor 11 is configured to perform signal processing on the reception signal to calculate a distance to the target object, a relative speed of the target object, and an angle at which the target object is located (hereinafter referred to as "the distance, the relative speed, and the angle of the target object").

Now, configurations of the respective parts of the radar device 1 are described.

The controller/signal processor 11 is configured to control operations of the respective parts, such as the transmission antennas Tx, the reception antennas Rx, the transmission circuit 12, and the reception circuit 13, which are included in the radar device 1. Moreover, the controller/signal processor 11 is configured to perform the signal processing on reception signals received by the reception antennas Rx to calculate the distance, the relative speed, and the angle of the target object.

The controller/signal processor 11 includes a processor, which is formed of a one-chip microcomputer having a function of a central processing unit (CPU), or a programmable logic device (PLD), for example, a field-programmable gate array (FPGA), and a memory, which is formed of a random access memory (RAM) and a read only memory (ROM), for example. Details of the operation of the controller/signal processor 11 are described later.

The transmission circuit 12 includes a voltage generating circuit 121, a voltage controlled oscillator 122, a distribution circuit 123, and a transmission selector switch 124.

The voltage generating circuit 121 is configured to generate a desired voltage waveform at a timing controlled by the controller/signal processor 11.

The voltage controlled oscillator 122 is configured to produce an oscillating transmission signal based on the voltage waveform generated by the voltage generating circuit 121.

The distribution circuit 123 is configured to amplify as appropriate the transmission signal produced by the voltage controlled oscillator 122. The distribution circuit 123 is configured to output the amplified transmission signal to the transmission selector switch 124, and to mixers 1301 to 1304 disposed in the reception circuit 13, which are to be described later.

The transmission selector switch 124 is connected to the transmission antenna Tx1 and the transmission antenna Tx2, and is configured to switch an output destination between the transmission antenna Tx1 and the transmission antenna Tx2 under control of the controller/signal processor 11. Therefore, the transmission signal output from the distribution circuit 123 is emitted as a beam formed of an electromagnetic wave from the transmission antenna Tx1 or Tx2 depending on a state of the transmission selector switch 124.

The emitted electromagnetic wave is reflected by the target object. The electromagnetic wave reflected by the target object is received by each of the reception antennas Rx1, Rx2, Rx3, and Rx4. The reception signals received by the reception antennas Rx1, Rx2, Rx3, and Rx4 are input to the reception circuit 13.

As illustrated in FIG. 1, the reception circuit 13 includes the mixers 1301 to 1304, filter circuits 1311 to 1314, and analog-to-digital converters (hereinafter referred to as "ADCs") 1321 to 1324.

The mixers 1301 to 1304, the filter circuits 1311 to 1314, and the ADCs 1321 to 1324 are each disposed with respect to the reception antennas Rx1 to Rx4, respectively.

The reception signals received by the reception antennas Rx1 to Rx4 are input to the mixers 1301 to 1304, respectively. As described above, the transmission signal is also input to each of the mixers 1301 to 1304 from the distribution circuit 123 of the transmission circuit 12. The mixers 1301 to 1304 are configured to mix the reception signals received by the reception antennas Rx1 to Rx4, respectively, with the transmission signal input from the distribution circuit 123 of the transmission circuit 12, and output the mixed signals.

Each of the filter circuits 1311 to 1314 includes a bandpass filter configured to extract a signal in a desired frequency band, and an amplifier circuit configured to amplify the signal. The filter circuits 1311 to 1314 extract and amplify only signals of the desired frequency band from mixed waves output from the mixers 1301 to 1304, respectively, and output the amplified signals as reception signal voltages.

Each of the ADCs 1321 to 1324 includes a converter configured to perform A/D conversion for converting an analog signal into a digital signal. The ADCs 1321 to 1324 perform the A/D conversion on the reception signal voltages output from the filter circuits 1311 to 1314, respectively, to convert the reception signal voltages into digital voltage data at a timing controlled by the controller/signal processor 11. The digital voltage data is input to the controller/signal processor 11, and is stored in the memory of the controller/signal processor 11 for use in arithmetic processing, which is to be described later.

Next, the transmission antennas Tx and the reception antennas Rx are described. The transmission antennas Tx1 and Tx2, and the reception antennas Rx1, Rx2, Rx3, and Rx4 are arranged in plane as illustrated in FIG. 2. In FIG. 2, the transmission antennas Tx1 and Tx2, and the reception antennas Rx1, Rx2, Rx3, and Rx4 are illustrated as black rectangles. In FIG. 2, as each of the transmission antennas Tx and each of the reception antennas Rx, a plurality of black rectangles that are arrayed vertically in line and connected by one solid line are regarded as one antenna. A direction of the solid line is hereinafter referred to as a "vertical direction".

The transmission antennas Tx and the reception antennas Rx are arranged as patch antennas on a board. The transmission antennas Tx and the reception antennas Rx may be arranged on the same board, or the transmission antennas Tx may be arranged on one board and the reception antennas Rx may be arranged on another board.

In the first embodiment, each of the transmission antennas Tx and the reception antennas Rx is formed of a combination of a plurality of element antennas. For example, in FIG. 2, when a black rectangle represents one element antenna, each of the transmission antennas Tx is formed of five element antennas. Similarly, each of the reception antennas Rx is formed of five element antennas. Moreover, the number of element antennas is not limited to five, and may be set to any number as appropriate.

The transmission antennas Tx1 and Tx2 are designed so as to have substantially the same emission characteristics. Similarly, the reception antennas Rx1 to Rx4 are designed to have substantially the same emission characteristics. It should be noted, however, that the emission characteristics of the transmission antennas Tx and the emission characteristics of the reception antennas Rx may be different. An emission direction of radio waves emitted from the transmission antennas Tx is a direction perpendicular to a plane of the board.

As illustrated in FIG. 2, the transmission antennas Tx are arranged side by side so as to be in parallel to each other on the plane of the board. The array direction is hereinafter referred to as a "first array direction". The first array direction is a direction perpendicular to the above-mentioned "vertical direction" in the plane of the board. Moreover, when a distance determined based on a range of fields of view of the radar device 1 is defined as a "distance d", an antenna interval between the two transmission antennas Tx1 and Tx2 is an interval that is larger than the distance d.

In the example of FIG. 2, the antenna interval between the transmission antennas Tx1 and Tx2 is 3d. To give more details, specifically, a distance between a center position of the transmission antenna Tx1 and a center position of the transmission antenna Tx2 is 3d. When there are two or more transmission antennas Tx, any arrangement may be employed as long as an antenna interval between at least two of the transmission antennas Tx is an interval that is larger than the distance d.

Similarly, as illustrated in FIG. 2, the reception antennas Rx are arranged side by side so as to be in parallel to one another on the plane of the board. The array direction of the reception antennas Rx is a direction parallel to the first array direction. The array direction is hereinafter referred to as a "second array direction". The second array direction is a direction perpendicular to the above-mentioned "vertical direction" in the plane of the board. Moreover, an antenna interval between at least two of the reception antennas Rx is an interval that is larger than the distance d. In this manner, the reception antennas Rx have an antenna arrangement including at least one part in which two or more reception antennas Rx are arranged at equal intervals that are larger than the distance d. In FIG. 2, the transmission antennas Tx and the reception antennas Rx are arranged side by side on the same axis, but the transmission antennas Tx and the reception antennas Rx are not necessarily required to be arranged side by side on the same axis as long as the first array direction and the second array direction are parallel to each other.

In the example of FIG. 2, the reception antennas Rx1 to Rx4 are arranged in the stated order at equal antenna intervals of 2×d (hereinafter expressed as "2d"). Specifically, a distance between a center position of the reception antenna Rx1 and a center position of the reception antenna Rx2 is 2d. Similarly, a distance between the center position of the reception antenna Rx2 and a center position of the reception antenna Rx3 is 2d. Similarly, a distance between the center position of the reception antenna Rx3 and a center position of the reception antenna Rx4 is 2d.

Moreover, in the first embodiment, virtual reception antennas is composed of the transmission antennas Tx and the reception antennas Rx. The virtual reception antennas refer to virtual reception antennas formed by the multiple-input multiple-output (MIMO) technology. In general, the virtual reception antennas are often formed of a plurality of transmission antennas arranged at first intervals, and a plurality of reception antennas arranged at second intervals, which are narrower than the first intervals, and are configured such that transmission signals from the transmission antennas are received by each of the reception antennas and subjected to the signal processing, to thereby interpolate the transmission antennas having larger intervals with the reception antennas. In such radar device, the number of virtual reception antennas corresponds to the number of reception antennas multiplied by the number of transmission antennas, and desired antenna directivity can be achieved with a smaller number of element antennas as compared to a case of one transmission antenna.

An antenna arrangement of virtual reception antennas VR1 to VR8 formed by the transmission antennas Tx and the reception antennas Rx having the antenna arrangement of FIG. 2 is illustrated in FIG. 5. In the first embodiment, there is adopted a configuration including at least one part in which an antenna interval between a pair of two of the virtual reception antennas VR1 to VR8 is the distance d or less and is more than 0.

In the example of FIG. 5, the virtual reception antennas VR1 to VR8 are arranged in the following order: VR1, VR2, VR5, VR3, VR6, VR4, VR7, and VR8. Hereinafter, an antenna interval between two virtual reception antennas is referred to as "a virtual antenna interval". Of the virtual reception antennas VR1 to VR8, five virtual antenna intervals between the virtual reception antennas VR2 and VR5, between the virtual reception antennas VR5 and VR3, between the virtual reception antennas VR3 and VR6, between the virtual reception antennas VR6 and VR4, and between the virtual reception antennas VR4 and VR7 are all the distance d, and hence satisfy the condition of being the distance d or less and being more than 0 (0<the interval≤d). Meanwhile, virtual antenna intervals between the virtual reception antennas VR1 and VR2 and between the virtual reception antennas VR7 and VR8 are both the distance 2d, and are larger than the distance d (d<the interval). Of the virtual reception antennas VR1 to VR8, the virtual reception antennas VR1, VR2, VR3, and VR4 are virtual reception antennas formed by signals transmitted by the transmission antenna Tx1 and received by the reception antennas Rx1 to Rx4, and the virtual reception antennas VR5, VR6, VR7, and VR8 are virtual reception antennas formed by signals transmitted by the transmission antenna Tx2 and received by the reception antennas Rx1 to Rx4.

Next, a description is given of a method of determining the distance d, and a method of determining the antenna intervals between the transmission antennas Tx, the antenna intervals between the reception antennas Rx, and the virtual antenna intervals between the virtual reception antennas VR.

As described above, in FIG. 2, the antenna interval between the transmission antennas Tx1 and Tx2 is 3×d (hereinafter expressed as "3d"). Moreover, as illustrated in FIG. 2, the antenna interval between each pair of adjacent reception antennas Rx is 2d.

In the radar device 1 according to the first embodiment, it is assumed that the transmission signals are emitted alternately from the transmission antenna Tx1 and the transmission antenna Tx2 in accordance with the modulation pattern illustrated in FIG. 4, which is to be described later, for example, under the control of the controller/signal processor 11. At this time, the radar device 1 can receive signals of virtual reception channels corresponding to a total of eight channels including four channels of the signals transmitted by the transmission antenna Tx1 and received by the reception antennas Rx1 to Rx4, and four channels of the signals transmitted by the transmission antenna Tx2 and received by the reception antennas Rx1 to Rx4. As illustrated in FIG. 5, the virtual reception channels are a total of eight channels received by the respective virtual reception antennas VR1 to VR8, and are hereinafter referred to as "virtual reception channels VRC1 to VRC8", respectively.

As described above, in the first embodiment, a part of the virtual antenna intervals of the virtual reception antennas VR1 to VR8 is set to the distance d. The distance d is a value determined based on the range of fields of view of the radar device 1. The distance d is determined based on the range of fields of view of the radar device 1 such that an angle θ of the target object can be measured with desired accuracy in a desired range of fields of view of the radar device 1.

For example, in a phase mono-pulse method, as illustrated in FIG. 3, when a virtual antenna interval between given two virtual reception antennas VR2 and VR5 is represented by d, a wavelength of the transmission signal is represented by λ, and a phase difference between the two virtual reception antennas VR2 and VR5 is represented by φ, for example, the following relationship is established between the phase difference φ and an angle θ of a target object OBJ01. In this case, as illustrated in FIG. 3, the angle θ is an angle of the target object OBJ01 with the emission direction of the transmission signal being θ=0.

$$\varphi = (2\pi d/\lambda) \cdot \sin\theta \qquad (1)$$

$$\theta = \sin^{-1}(\varphi\lambda/2\pi d) \qquad (2)$$

Now, the phase difference φ is in a range of ±π. Therefore, when the distance d is large, the range of fields of view of the radar device 1, that is, a range of the angle θ that can be measured is narrow. Meanwhile, when the distance d is small, the range of fields of view of the radar device 1, that is, the range of the angle θ that can be measured is wide. As is apparent from the expressions (1) and (2), in order to measure the angle θ in a range of fields of view of −90 deg≤θ≤+90 deg, for example, it is required to set the distance d to be in a range of d≤λ/2.

As described above, the distance d is the value determined based on the desired range of fields of view required of the radar device 1, that is, the range of the angle θ that is desired to be measured. In other words, when the virtual antenna interval between the virtual reception antennas is larger than the distance d, the desired range of fields of view of the radar device 1 cannot be secured. Therefore, when it is desired to achieve angle measurement processing in the desired range of fields of view of the radar device 1, it is required to perform setting so as to include a part in which the virtual antenna interval between the virtual reception antennas is the distance d or less and is more than 0.

Moreover, based on the relationship of the expression (2), the distance d is changed also by the wavelength λ of the transmission signal. Therefore, when the wavelength λ of the transmission signal is variable, the distance d is determined based on the desired range of fields of view of the radar device 1 and the wavelength λ of the transmission signal.

Next, a description is given of the method of determining the antenna intervals between the reception antennas Rx and the antenna interval between the transmission antennas Tx.

When the antenna interval between the antennas is shorter than the predetermined value, an error between channels occurs in one or both of the amplitude and the phase due to leakage of the transmission signal or the reception signals between the antennas. In other words, the transmission signal leaks from the transmission antennas Tx to the reception antennas Rx, the reception signals leaks from the reception antennas Rx to the transmission antennas Tx, leakage occurs between transmission channels in the transmission antennas Tx, or leakage occurs between reception channels in the transmission antennas Rx. The error between channels that occurs in one or both of the amplitude and the phase due to such leakage of the transmission signals and the reception signals results in reduction of angle measurement accuracy of the radar.

For example, in the case of the phase mono-pulse method, based on the expression (2), a phase error between channels leads to an error in phase difference φ between the reception antennas, and to an error in angle θ.

However, when the antenna intervals are increased in order to suppress the occurrence of the phase error between channels, as apparent from the expression (2), the range of fields of view of the radar device 1 becomes narrower.

To address the above-mentioned problem, in the first embodiment, there is adopted the antenna arrangement for suppressing the occurrence of the errors between channels in amplitude and phase while maintaining the desired range of fields of view. Specifically, in the first embodiment, the transmission antennas Tx and the reception antennas Rx are arranged at intervals that are larger than the distance d that is determined based on the range of fields of view of the radar device 1, and the transmission antennas Tx and the reception antennas Rx are arranged so as to satisfy the condition that the antenna arrangement of the virtual reception antennas has at least one part in which the virtual antenna interval is the distance d or less and is more than 0 (0<the virtual antenna interval≤d).

As a result, actual antenna intervals between the transmission antennas Tx and the reception antennas Rx may be set to be larger than the distance d. In this manner, in the radar device of the first embodiment, the actual antenna intervals are set to be large, and hence as compared to the related-art radar device in which the actual antenna intervals are the distance d or less, the leakage between antennas of the transmission signals or the reception signals can be reduced. As a result, the occurrence of the errors between channels in amplitude and phase can be reduced, and high angle measurement performance of the radar device 1 can be maintained.

Moreover, in the radar device 1 according to the first embodiment, the antenna arrangement of the virtual reception antennas VR has at least one part in which the virtual antenna interval is the distance d or less and is more than 0, with the result that the angle of the target object can be measured without ambiguity, that is, with high accuracy in the range of fields of view of the radar device 1.

In FIG. 2, of antenna arrangements that satisfy the above-mentioned condition, the radar device with a transmission antenna interval of 3d and a reception antenna interval of 2d is illustrated as an exemplary embodiment of the present invention.

The antenna arrangement of FIG. 2 has a feature of including an equal interval array part in which the virtual reception antennas VR are arranged at equal virtual antenna intervals of d as illustrated in FIG. 5. Specifically, in the equal interval array part, the virtual reception antennas VR2 to VR7 are positioned side by side at equal intervals of d.

In FIG. 2, there is illustrated an example in which the number of rows of transmission antennas Tx is one and the number of rows of reception antennas Rx is one. However, the number of rows of transmission antennas Tx and the number of rows of reception antennas Rx may each be two or more as long as the actual antenna intervals are set to be more than d.

Now, operation of the radar device 1 is described.

First, in the transmission circuit 12, the voltage generating circuit 121 generates the desired voltage waveform at the timing controlled by the controller/signal processor 11. The voltage controlled oscillator 122 generates the transmission signal based on the generated voltage waveform, and outputs the generated transmission signal. The distribution circuit 123 outputs the transmission signal to the transmission selector switch 124, and to the mixers 1301 to 1304 of the reception circuit 13. The transmission signal is emitted from the transmission antenna Tx1 or Tx2 depending on the state of the transmission selector switch 124.

The emitted transmission signal is reflected by the target object. The transmission signal reflected by the target object is received by each of the reception antennas Rx1, Rx2, Rx3, and Rx4, and is input as the reception signal to the reception circuit 13.

In the reception circuit 13, the mixers 1301 to 1304, the filter circuits 1311 to 1314, and the ADCs 1321 to 1324 are connected to the reception antennas Rx1 to Rx4, respectively.

In the reception circuit 13, the mixers 1301 to 1304 mix the transmission signal from the distribution circuit 123 with the reception signals from the reception antennas Rx1 to Rx4, respectively. Next, the filter circuits 1311 to 1314 extract only the signals in the desired frequency band from the mixed signals. The ADCs 1321 to 1324 subject the reception signal voltages, which are outputs from the filter circuits 1311 to 1314, to the A/D conversion to obtain the digital voltage data at the timing controlled by the controller/signal processor 11. The digital voltage data is input to the controller/signal processor 11 to be stored in the memory. The controller/signal processor 11 reads the digital voltage data from the memory for use in the arithmetic processing, which is to be described later.

Next, details of the operation of the controller/signal processor 11 are described.

The first embodiment is not limited by the radar method, and is applicable to various radar methods, such as the frequency modulated continuous wave (FM-CW) method, the fast chirp modulation (FCM) method, and the pulse Doppler method.

For example, an example of a modulation pattern in a case of a radar device (time-division MIMO) in which switching is performed in time between the transmission antennas Tx1 and Tx2 for transmission in the FCM method is illustrated in FIG. 4.

As illustrated in FIG. 4, in the FCM method, an electromagnetic wave that has been subjected to modulation in which a frequency is increased (up-chirp) or reduced (down-chirp) with a certain inclination is repeatedly transmitted. One modulation is hereinafter referred to as a "chirp", and a series of chirps that is repeatedly transmitted is called a "chirp sequence". In FIG. 4, an example of a chirp sequence formed of down-chirps is illustrated. In this example, as an example of the time-division MIMO, switching is performed between the transmission antennas Tx1 and Tx2 for each chirp for transmission. Moreover, the number of chirps is N in total for the transmission antennas Tx1 and Tx2. The first embodiment is applicable without depending on various parameters of the chirp sequence, such as the inclination and a modulation width of the chirps illustrated in FIG. 4.

With the above-mentioned modulation pattern, as described above, the following signals can be received: the signals of the virtual reception channels corresponding to the total of eight channels of the reception signals obtained by transmitting the transmission signal from the transmission antenna Tx1 and receiving the transmission signal by the reception antennas Rx1 to Rx4, and the reception signals obtained by transmitting the transmission signal from the transmission antenna Tx2 and receiving the transmission signal by the reception antennas Rx1 to Rx4. As illustrated in FIG. 5, the virtual reception channels are a total of eight channels: the virtual reception channels VRC1 to VRC8 corresponding to the virtual reception antennas VR1 to VR8, respectively.

The controller/signal processor 11 receives as inputs data of the virtual reception channels corresponding to the eight channels to measure the distance and the relative speed of the target object in the FCM method. A principle of measuring the distance and the relative speed in the FCM method is a known technology as described in Japanese Patent Application Laid-open No. 2016-3873, for example. Now, the operation of the controller/signal processor 11 is described with reference to FIG. 6.

FIG. 6 is a flow chart for illustrating a processing flow through which the distance, the relative speed, and the angle of the target object is measured by the controller/signal processor 11. It should be noted, however, that FIG. 6 is merely an example, and the first embodiment is not limited to a signal processing method illustrated in FIG. 6.

First, in Step S11, the controller/signal processor 11 receives as the inputs the obtained data of the virtual reception channels corresponding to the eight channels to perform frequency conversion processing. A description is given on the assumption that, as the frequency conversion processing, two-dimensional fast Fourier transform (FFT) is used in this case as described in paragraph [0027] of Japanese Patent Application Laid-open No. 2016-3873, for example.

Specifically, first FFT processing is executed on the data of each chirp of FIG. 4 to generate a power spectrum. Next, processing results are collected over all the chirps for each frequency bin, and second FFT processing is executed on the processing results. In this case, beat signals detected for each chirp by the transmission signals reflected by the same target object, that is, frequencies of peak components in the power spectrum are the same.

However, when the target object and the own vehicle have relative speeds, a phase of the beat signal is slightly different for each chirp. In other words, in a result of the second FFT processing, the power spectrum with a frequency component corresponding to a phase rotation speed being the frequency bin, that is, a speed bin, is determined for each frequency bin, that is, for each distance bin obtained as the result of the first FFT processing. A power spectrum obtained by the second FFT processing is hereinafter referred to as a "two-dimensional power spectrum".

Next, in Step S12, the controller/signal processor 11 extracts a peak from the two-dimensional power spectrum. Examples of a method of extracting the peak include known constant false alarm (CFAR). Alternatively, as another method, there may be used a method of extracting a frequency bin that exceeds a preset threshold and takes a maximum value from among the frequency bins, for example, or there may be used any method as long as the method allows reflection from the target object to be detected.

Moreover, in the preceding stage of the peak detection, data of the virtual reception channels may be added together. For example, the peak may be extracted after amplitude values of the eight virtual reception channels are added and averaged, or the peak may be detected after the beam is directed to a preset direction by known digital beam forming (DBF) processing.

Next, in Step S13, the controller/signal processor 11 calculates, for the detected peak, the distance and the relative speed of the target object based on the principle of the known FCM method as described in Japanese Patent Application Laid-open No. 2016-3873, for example. In the first embodiment, the method of calculating the distance and the relative speed of the target object is not limited to this case, and any method may be used.

Next, in Step S14, the controller/signal processor 11 measures the angle of the target object. There are various methods of measuring the angle, such as the beam former method and a superresolution direction finding method, and the first embodiment is not intended to limit the angle measurement method. In this case, the above-mentioned case in which the angle is measured by the phase mono-pulse method is described as an example.

For example, phase mono-pulse angle measurement is performed based on the expression (2) with signals of all reception channels having a virtual interval of the virtual reception channels of FIG. 5 of the distance d, that is, the virtual reception channels of five intervals between the virtual reception antennas VR2 and VR5, between the virtual reception antennas VR5 and VR3, between the virtual reception antennas VR3 and VR6, between the virtual reception antennas VR6 and VR4, and between the virtual reception antennas VR4 and VR7. An average value of five angles obtained as a result of the measurement is determined, and the average value is output as the angle of the target object.

As described above, in the first embodiment, the signals of the virtual reception channels having the virtual reception antenna interval of the distance d are used to determine the angle of the target object, and as a result, an angle measurement value corresponding to the reception channel interval of d is obtained. Therefore, as described above, the angle within the range of fields of view of the radar device 1 can be measured by the phase mono-pulse angle measurement.

Moreover, signals between the virtual reception channels having a virtual reception channel interval of 2d, that is, between the virtual reception antennas VR1 and VR2 and between the virtual reception antennas VR7 and VR8 may further be used. In that case, as in the method described in paragraphs [0059] to [0061] of Japanese Patent No. 5602275, the angle of the target object may be calculated by a method in which angle candidates obtained with the antenna interval of d and angle candidates obtained with the antenna interval of 2d are combined, for example. Specifically, an angle candidate closest to the angle candidates obtained with the antenna interval of d is selected from among the angle candidates obtained with the antenna interval of 2d, and the selected angle of the antenna interval of 2d is determined as the angle of the target object.

Moreover, in this example, each pair of adjacent virtual reception antennas, that is, the virtual reception antennas VR2 and VR5, VR5 and VR3, VR3 and VR6, VR6 and VR4, VR4 and VR7, VR1 and VR2, and VR7 and VR8 has been combined to calculate the angle. However, the present invention is not limited thereto, and how to combine the virtual reception channels may be changed as appropriate. Examples of the combination are described below.

In the first embodiment, as an example of a combination of the virtual reception channels in the case where the angle measurement processing on the assumption of an equal-interval array is desired to be applied, virtual reception antennas arranged at equal virtual antenna intervals of d, such as the virtual reception antennas VR2, VR5, VR3, VR6, VR4, and VR7, are selected to perform the angle measurement processing, to thereby determine the angle of the target object.

Moreover, as another example of the combination of the virtual reception channels in the case where the angle measurement processing on the assumption of the equal-interval array is desired to be applied, the following combination may be used. Specifically, a beam A is formed with four channels of the virtual reception antennas VR1, VR2, VR3, and VR4 as the virtual reception antennas arranged at equal virtual antenna intervals of 2d being one antenna. Similarly, a beam B is formed with four channels of the virtual reception antennas VR5, VR6, VR7, and VR8 arranged at equal virtual antenna intervals of 2d being one antenna. Then, the angle measurement processing may be performed using the beam A and the beam B to determine the angle of the target object.

The controller/signal processor 11 calculates the distance, the relative speed, and the angle of the target object in the radar device 1 by the above-mentioned method. The above-mentioned processing is performed for each chirp sequence that is repeated at preset time intervals as illustrated in FIG. 4, with the result that the distance, the relative speed, and the angle of the target object are repeatedly calculated at the time intervals.

Sensing results determined by the radar device 1, such as the distance, the relative speed, and the angle of the target object, are transmitted to the vehicle-side ECU 2. The vehicle-side ECU 2 uses the sensing results for control of various applications for a vehicle, for example.

In the controller/signal processor 11, through time-series processing or a technology called "tracking", time-series correlation is performed, and processing of smoothing errors of the sensing results, such as the distance, the relative speed, and the angle, may be performed by smoothing the sensing results in time series.

In the first embodiment, the case of the time-division MIMO method has been described as an example, but another method may be used as long as the signals of the transmission antennas Tx1 and Tx2 can be separated from each other. There may be applied a method in which the signals of the transmission antennas Tx1 and Tx2 are separated from each other by transmitting the signals by the transmission antennas Tx1 and Tx2 at different transmission frequencies or by transmitting the signals after being multiplied by signs that are orthogonal for the transmission antennas Tx1 and Tx2, for example.

As described above, in the first embodiment, the antenna arrangements of the transmission antennas Tx and the reception antennas Rx are set appropriately so as to have at least one part in which the virtual antenna intervals of the virtual reception antennas formed by the transmission antennas Tx and the reception antennas Rx is the distance d or less, with the result that the desired range of fields of view of the radar device can be secured.

Moreover, in the first embodiment, the antennas are arranged such that both of the antenna interval of the transmission antennas Tx and the antenna intervals of the reception antennas Rx are larger than the distance d. As described with reference to the related-art radar device described in Japanese Patent Translation Publication No. 2011-526373, when the distance between the antennas is d or less, the error between channels occurs in amplitude or phase. The error between the channels causes the reduction of the angle measurement accuracy of the radar, and as a result, recognition accuracy of the object is reduced.

However, in the first embodiment, both of the antenna interval of the transmission antennas Tx and the antenna intervals of the reception antennas Rx are set to be larger than the distance d, with the result that the leakage of the transmission signals or the reception signals may be prevented. As a result, the occurrence of the error between channels in amplitude or phase can be suppressed. As a result, the angle measurement accuracy of the radar device 1 can be increased, and the recognition accuracy of the target object can be increased.

Second Embodiment

In the description of the first embodiment described above, as illustrated in FIG. 1 and FIG. 2, the configuration including the two transmission antennas and the four reception antennas has been described, but as described above, the number of transmission antennas Tx and the number of reception antennas Rx are not limited thereto.

That is, the effects of the present invention can be obtained when all of the following conditions (1) to (3) are satisfied.

(1) The transmission antennas Tx is arranged side by side in the first array direction, and the reception antennas Rx are arranged side by side in the second array direction, which is parallel to the first array direction.

(2) The antenna intervals between the transmission antennas Tx and between the reception antennas Rx are larger than the distance d.

(3) The antenna arrangement of the virtual reception antennas VR has one or more parts in which the virtual antenna interval is the distance d or less and is more than 0.

Figure 7:
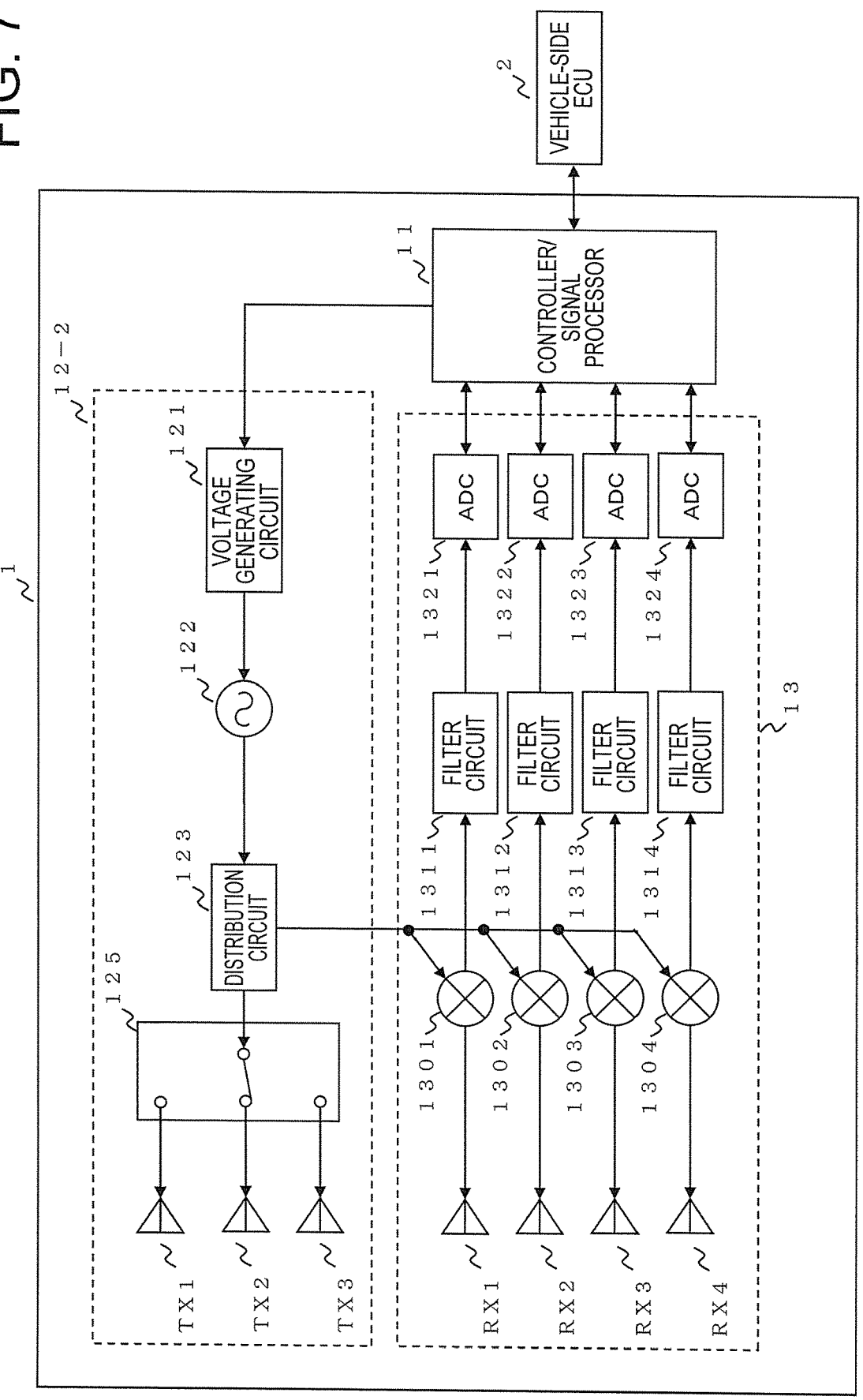
FIG. 7 is a block diagram for illustrating a configuration of a radar device according to a second embodiment of the present invention.
Figure 8:
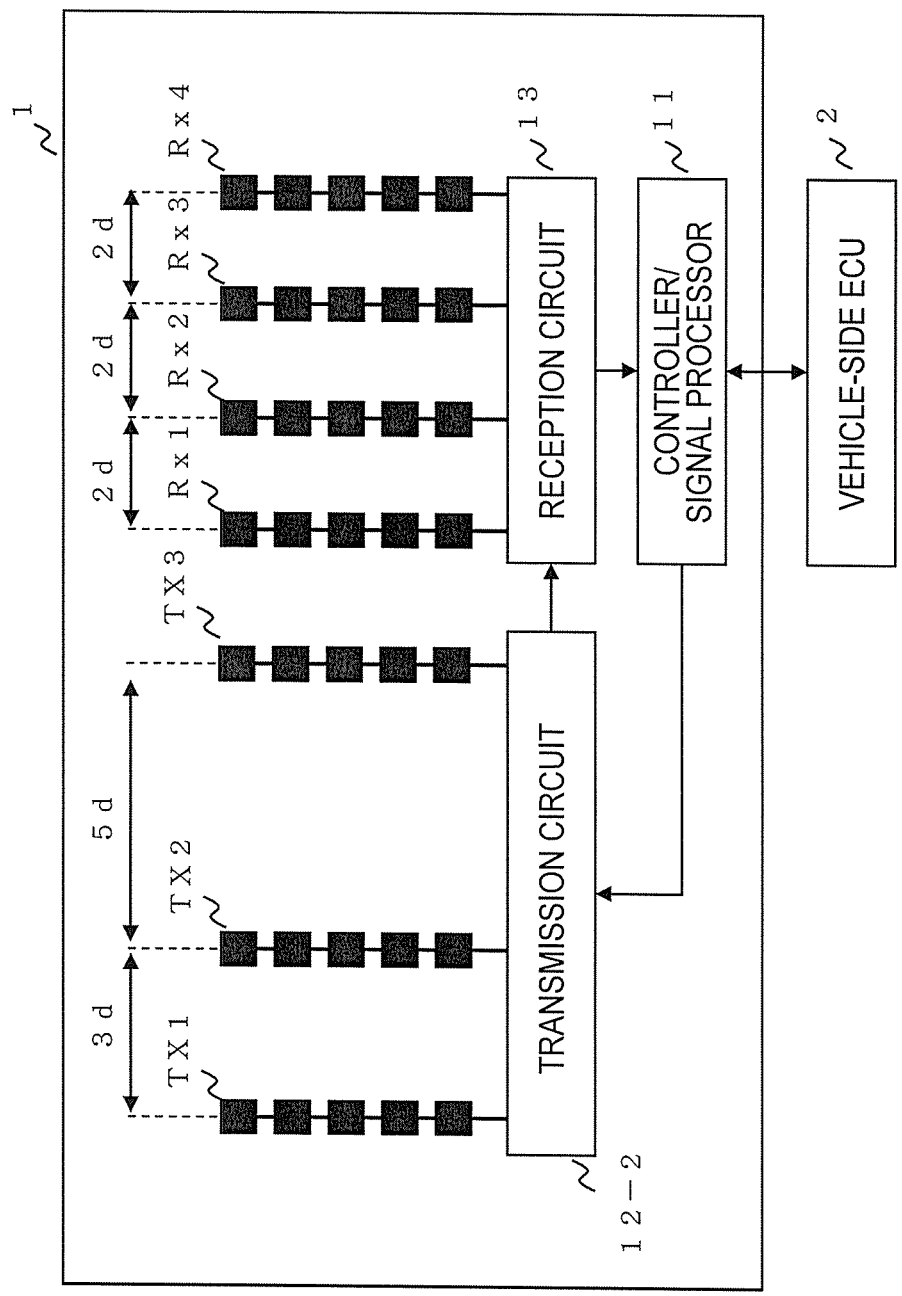
FIG. 8 is a diagram for illustrating an antenna arrangement of transmission antennas and reception antennas of the radar device according to the second embodiment of the present invention.
Figure 9:
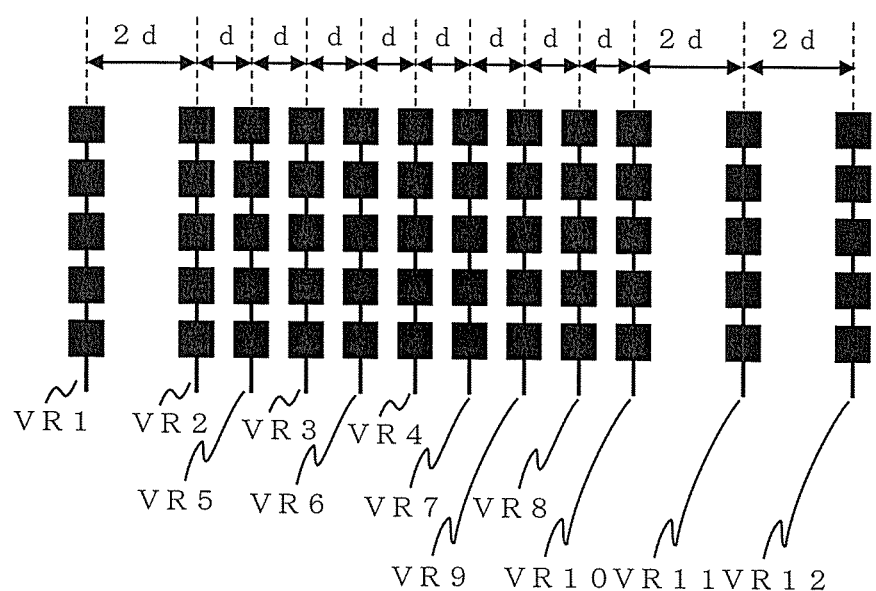
FIG. 9 is a diagram for illustrating an antenna arrangement of virtual reception antennas of the radar device according to the second embodiment of the present invention.

Therefore, in a second embodiment of the present invention, as illustrated in FIG. 7 to FIG. 9, a description is given of an embodiment of a case in which three transmission antennas Tx are provided.

FIG. 7 is an overall configuration diagram for illustrating a configuration of a radar device according to the second embodiment of the present invention. FIG. 8 is a diagram for illustrating an antenna arrangement of the radar device according to the second embodiment of the present invention. FIG. 7 is a diagram for illustrating an antenna arrangement of virtual reception antennas of the radar device according to the second embodiment of the present invention.

As can be seen when FIG. 1 is compared with FIG. 7, differences between the second embodiment and the first embodiment described above reside in that, in FIG. 7, the number of transmission antennas Tx is three, and accordingly, a transmission circuit 12-2 includes a transmission selector switch 125 instead of the transmission selector switch 124 of FIG. 1.

The transmission selector switch 125 is connected to transmission antennas Tx1, Tx2, and Tx3, and is configured to switch an output destination among the transmission antennas Tx1 to Tx3 under control of the controller/signal processor 11. Therefore, a transmission signal output from the distribution circuit 123 is emitted as a beam of an electromagnetic wave from any one of the transmission antennas Tx1 to Tx3 depending on a state of the transmission selector switch 125.

Moreover, in the second embodiment, as illustrated in FIG. 8, of the transmission antennas Tx, at least three transmission antennas Tx1 to Tx3 are arranged side by side at intervals that are larger than the distance d in the first array direction. In the example of FIG. 8, the transmission antennas Tx1 and Tx2 are arranged with an interval of 3d, and the transmission antennas Tx2 and Tx3 are arranged with an interval of 5×d (hereinafter expressed as "5d").

Moreover, an interval between two of the transmission antennas Tx is a distance corresponding to a value N×2d obtained by multiplying the number N of reception antennas Rx by the distance 2d. In the example of FIG. 8, the number of reception antennas Rx is four, and hence an interval between the transmission antenna Tx1 and the transmission antenna Tx3 is 4×2d=8d. Specifically, a distance between a center position of the transmission antenna Tx1 and a center position of the transmission antenna Tx2 is 3d, and a distance between the center position of the transmission antenna Tx2 and a center position of the transmission antenna Tx3 is 5d.

In the second embodiment, the arrangement of the reception antennas Rx1 to Rx4 is the same as in the first embodiment described above, and hence a description thereof is omitted here.

In a radar device 1 according to the second embodiment, it is assumed that the transmission signals are emitted alternately from the transmission antennas Tx1, Tx2, and Tx3 in the stated order in accordance with the modulation pattern of FIG. 4, for example, under the control of the controller/signal processor 11. At this time, the radar device 1 can receive signals of virtual reception channels corresponding to a total of twelve channels including four channels of the signals transmitted by the transmission antenna Tx1 and received by the reception antennas Rx1 to Rx4, four channels of the signals transmitted by the transmission antenna Tx2 and received by the reception antennas Rx1 to Rx4, and four channels of the signals transmitted by the transmission antenna Tx3 and received by the reception antennas Rx1 to Rx4. As illustrated in FIG. 9, the virtual reception channels are a total of twelve channels received by virtual reception antennas VR1 to VR12, respectively.

In the second embodiment, the virtual reception antennas VR1 to VR12 are arranged so as to have at least one part in which a virtual antenna interval thereof is the distance d or less and is more than 0. In the example of FIG. 9, the virtual reception antennas VR1 to VR12 are arranged in the following order: VR1, VR2, VR5, VR3, VR6, VR4, VR7, VR9, VR8, VR10, VR11, and VR12. Of the virtual reception antennas VR1 to VR12, eight virtual antenna intervals between the virtual reception antennas VR2 and VR5, between the virtual reception antennas VR5 and VR3, between the virtual reception antennas VR3 and VR6, between the virtual reception antennas VR6 and VR4, between the virtual reception antennas VR4 and VR7, between the virtual reception antennas VR7 and VR9, between the virtual reception antennas VR9 and VR8, and between the virtual reception antennas VR8 and VR10 are all the distance d, and hence satisfy the condition of being the distance d or less and being more than 0. Meanwhile, virtual antenna intervals between the virtual reception antennas VR1 and VR2, between the virtual reception antennas VR10 and VR11, and between the virtual reception antennas VR11 and VR12 are all the distance 2d, and are larger than the distance d.

The other configurations and operations are the same as in the first embodiment, and a description thereof is omitted here.

In the second embodiment, when the transmission antennas Tx and the reception antennas Rx are arranged in the antenna arrangement illustrated in FIG. 8, the virtual reception antennas VR1 to VR12 can be arranged as illustrated in FIG. 9. As a result, the number of virtual reception antennas arranged at the virtual antenna intervals of the distance d can be increased in the virtual reception antenna arrangement of FIG. 9 as compared to the virtual reception antenna arrangement of FIG. 5. As a result, when processing of measuring an angle with the equal-interval array is performed, the angle can be measured using a larger number of antennas, and hence the angle measurement accuracy is further increased.

Third Embodiment

Figure 10:
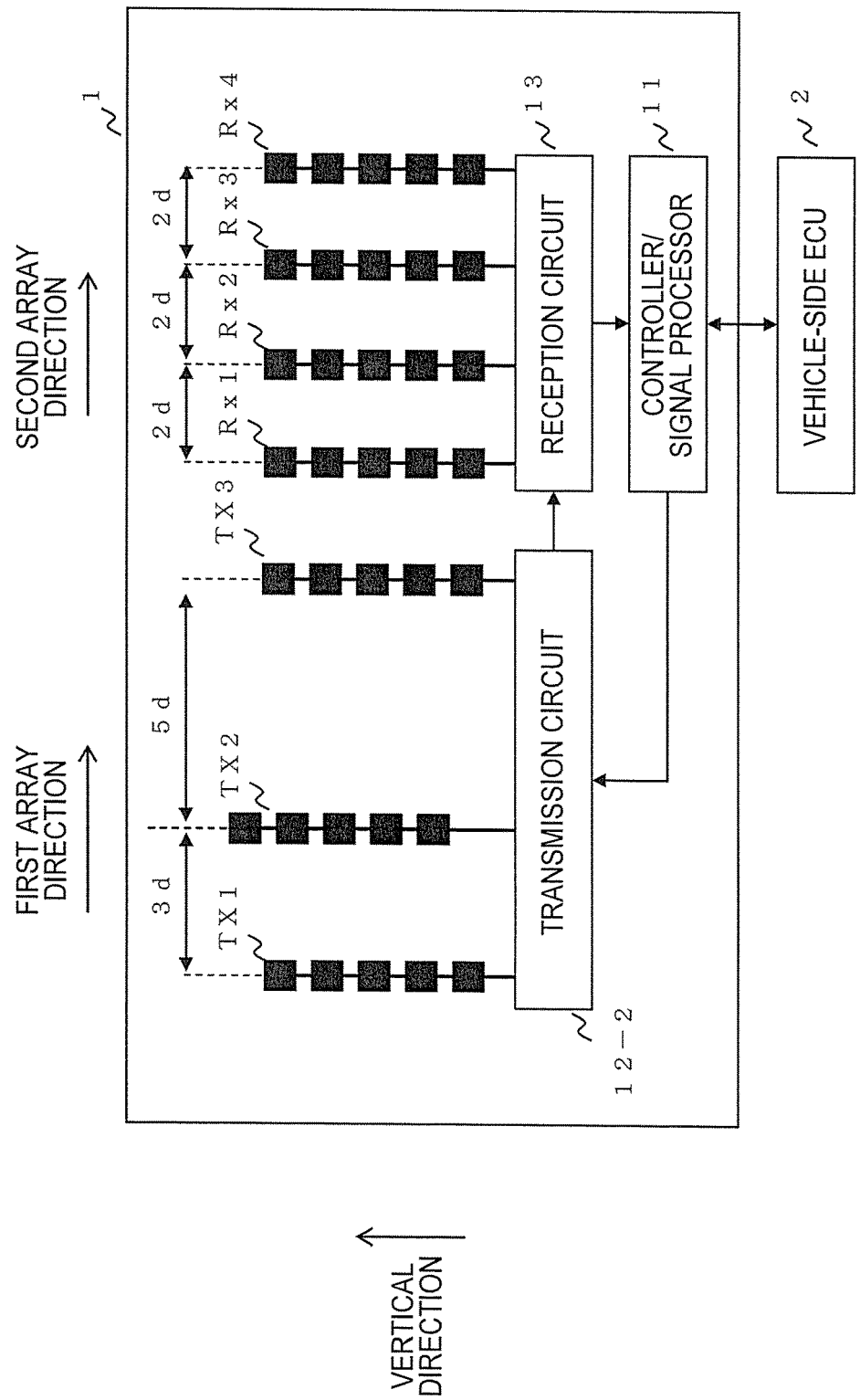
FIG. 10 is a diagram for illustrating an antenna arrangement of transmission antennas and reception antennas of a radar device according to a third embodiment of the present invention.

Further, a part of the transmission antennas Tx and a part of the reception antennas Rx may be arranged in the plane of the board as illustrated in FIG. 10 to be shifted in a direction perpendicular to the first and second array directions in which the transmission antennas Tx and the reception antennas Rx are arranged, that is, the "vertical direction" illustrated in FIG. 10.

In the first embodiment described above, as illustrated in FIG. 2, the plurality of transmission antennas Tx and the plurality of reception antennas Rx are arranged side by side in the same plane without being shifted in position in the "vertical direction".

In contrast, in a third embodiment of the present invention, as illustrated in FIG. 10, a description is given of an embodiment of a case in which an antenna arrangement of a part of the transmission antennas or apart of the reception antennas is shifted in the "vertical direction". In the example of FIG. 10, of the three transmission antennas Tx1 to Tx3, only the transmission antenna Tx2 is shifted in position from the other two transmission antennas Tx1 and Tx3 in the "vertical direction". In other words, the transmission antenna Tx2 is arranged to be shifted by a preset shift amount Δs1 in the "vertical direction". The shift amount Δs1 may be set to a suitable value as appropriate. Moreover, the transmission antenna Tx2 may be arranged to be shifted downward instead of upward in the "vertical direction".

It has been described with reference to the above-mentioned expressions (1) and (2) and FIG. 3 that, as the distance d of the virtual antenna intervals between the virtual reception antennas becomes narrower, the detection range of the angle θ that can be measured becomes wider. On the basis of an idea similar to that principle, as the shift amount Δs1 becomes smaller, the detection range of the angle that can be measured becomes wider. Therefore, the shift amount Δs1 is set as appropriate in consideration of the detection range of the angle θ that is desired to be measured, and other such factors.

Figure 11:
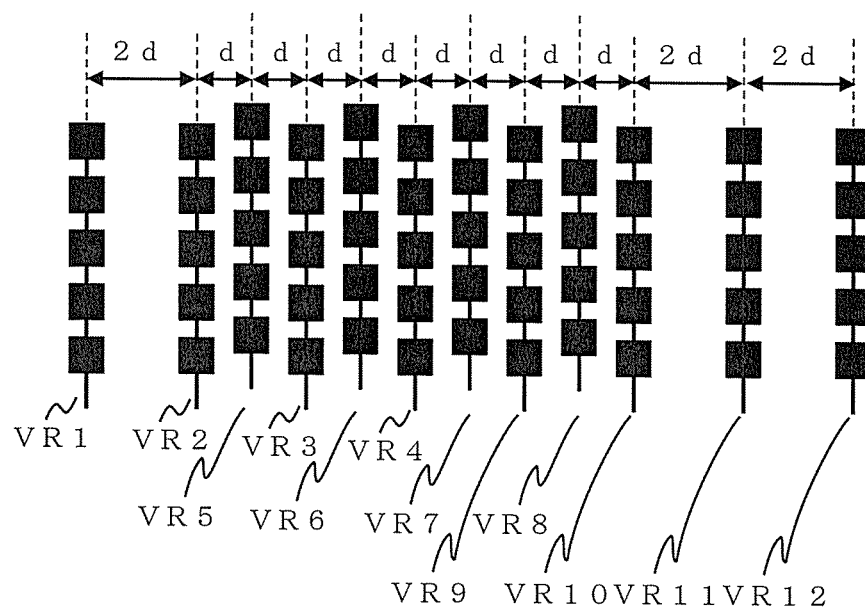
FIG. 11 is a diagram for illustrating an antenna arrangement of virtual reception antennas of the radar device according to the third embodiment of the present invention.

When the transmission antennas Tx and the reception antennas Rx are arranged as in FIG. 10, the antenna arrangement of the virtual reception antennas has a shape illustrated in FIG. 11.

With the transmission antenna Tx2 being shifted in position in the "vertical direction" as illustrated in FIG. 10, of the virtual reception antennas VR1 to VR12, the virtual reception antennas VR5, VR6, VR7, and VR8 are shifted in position in the "vertical direction" as illustrated in FIG. 11.

In the third embodiment, the transmission antennas Tx and the reception antennas Rx are arranged in this manner, to thereby obtain a configuration further having a function of measuring an angle in an up-and-down direction of the vehicle in addition to a left-and-right direction of the vehicle.

Specifically, when the transmission antennas and the reception antennas are mounted in the same plane to electrically scan in the left-and-right direction, the angle in the left-and-right direction of the target object can be detected. However, in that case, an angle in the up-and-down direction of the vehicle cannot be detected. Therefore, in the third embodiment, the antenna arrangement illustrated in FIG. 10 is adopted, with the result that the angle in the up-and-down direction of a traveling direction of the vehicle can also be measured.

In the example of FIG. 10, there has been described the example in which the transmission antenna Tx2 is shifted in position in the "vertical direction". However, the present invention is not limited thereto, and the transmission antenna Tx1 or the transmission antenna Tx3 may be shifted in position. Moreover, the number of transmission antennas Tx to be shifted in position is not limited to one, and a plurality of transmission antennas Tx may be shifted.

Moreover, instead of the transmission antennas Tx, the reception antennas Rx may be shifted in position in the "vertical direction". Specifically, of the reception antennas Rx1 to Rx4, at least one reception antenna Rx is arranged to be shifted by a preset shift amount Δs2 upward in the "vertical direction". The shift amount Δs2 may be set to a suitable value as appropriate. As the shift amount Δs1 becomes smaller, the detection range of the angle that can be measured becomes wider. Moreover, the shift amount Δs1 and the shift amount Δs2 may be the same value or different values. The amount of shifting in the "vertical direction" may be set to be different for each transmission antenna and/or each reception antenna. For example, a shift amount Δs3 between the reception antennas Rx1 and Rx2, a shift amount Δs4 between the reception antennas Rx2 and Rx3, and a shift amount Δs5 between the reception antennas Rx3 and Rx4 may be different values.

As described above, in the third embodiment, a part of the transmission antennas Tx or a part of the reception antennas Rx is shifted in the "vertical direction". Therefore, the transmission antennas Tx or the reception antennas Rx are divided into an upper antenna group and a lower antenna group. With the transmission antennas Tx and the reception antennas Rx being arranged as described above, the angle in the "vertical direction", that is, the up-and-down direction with respect to a road surface can also be measured. In general, objects, such as a road sign and a direction board, are often mounted at high positions with respect to the road surface. Such objects cannot be obstacles of the own vehicle because of the high positions. Therefore, a part of the transmission antennas Tx or a part of the reception antennas Rx is shifted by the shift amount Δs1 or Δs2 in the "vertical direction" in the plane of the board. As a result, the angle of the target object in the up-and-down direction with respect to the road surface can be measured, and hence it can be determined whether the object can be an obstacle.

As described above, according to the third embodiment, the number of transmission antennas Tx is three, and hence, as in the second embodiment described above, the angle measurement accuracy can be increased further as compared to the first embodiment. Further, in the third embodiment, at least one of the three transmission antennas Tx is arranged to be shifted by the preset shift amount Δs1 in the "vertical direction" in the plane of the board. As a result, not only the angle in the left-and-right direction but also the angle in the up-and-down direction can be measured.

In the third embodiment, there has been described the example in which the arrangement is shifted from the antenna arrangement in the second embodiment. However, the present invention is not limited thereto, and the arrangement may be shifted from the antenna arrangement in the first embodiment.

The radar device according to the present invention is suitable as a radar device to be mounted on various moving objects, such as a vehicle and a vessel.

What is claimed is:

1. A radar device, comprising:
a plurality of transmission antennas, wherein each of the plurality of transmission antennas emits a transmission signal toward an object in surroundings and comprises a plurality of respective transmission elements;
a plurality of reception antennas, wherein each of the plurality of reception antennas receives the transmission signal reflected by the object to output the received transmission signal as a reception signal and comprises a plurality of respective reception elements; and
a signal processor to process the reception signal output from each of the plurality of reception antennas,
wherein, when a distance determined based on a range of fields of view required of the radar device is defined as a distance d:
the plurality of transmission antennas are arranged side by side, wherein an antenna interval in a first array direction therebetween is larger than the distance d, the first array direction being perpendicular to an emission direction of the transmission signal;
the plurality of reception antennas are arranged side by side in the first array direction at a constant antenna interval, wherein the constant antenna interval is larger than the distance d in a second array direction, which is perpendicular to the emission direction; and
virtual reception antennas comprise the plurality of transmission antennas and the plurality of reception antennas, and the virtual reception antennas have an antenna arrangement including at least one part in which a virtual antenna interval is the distance d or less,
wherein each of the plurality of transmission antennas comprises the plurality of transmission elements arranged in line in a third direction perpendicular to the first array direction in a plane that is perpendicular to the emission direction of the transmission signal, and
wherein said first and second transmission antennas have an antenna interval of a distance nd, where n is an odd integer and not equal to 1.

2. The radar device according to claim 1,
wherein the at least two transmission antennas include the first transmission antenna and the second transmission antenna,
wherein the first transmission antenna and the second transmission antenna have an antenna interval of a distance 3×d,
wherein the plurality of reception antennas have an antenna arrangement wherein the constant antenna interval is a distance 2×d, and
wherein the virtual reception antennas have an antenna arrangement including at least one part in which a virtual antenna interval is the distance d.

3. The radar device according to claim 1, wherein the distance d is determined based on the range of fields of view required of the radar device and a wavelength of the transmission signal.

4. A radar device, comprising:
a plurality of transmission antennas, wherein each of the plurality of transmission antennas emits a transmission signal toward an object in surroundings;

a plurality of reception antennas, wherein each of the plurality of reception antennas receives the transmission signal reflected by the object to output the received transmission signal as a reception signal; and a signal processor to process the reception signal output from each of the plurality of reception antennas, wherein, when a distance determined based on a range of fields of view required of the radar device is defined as a distance d:

of the plurality of transmission antennas, at least two transmission antennas are arranged side by side with an antenna interval that is larger than the distance d in a first array direction, which is perpendicular to an emission direction of the transmission signal;

the plurality of reception antennas are arranged side by side at a constant antenna interval, wherein the constant antenna interval is larger than the distance d in the first array direction, which is perpendicular to the emission direction; and virtual reception antennas comprise the plurality of transmission antennas and the plurality of reception antennas, and the virtual reception antennas have an antenna arrangement including at least one part in which a virtual antenna interval is the distance d or less, wherein the at least two transmission antennas include three transmission antennas arranged in order of a first transmission antenna, a second transmission antenna, and a third transmission antenna, wherein the first transmission antenna and the second transmission antenna have an antenna interval of a distance 3×d, wherein the first transmission antenna and the third transmission antenna have an antenna interval of a distance corresponding to a value N×2×d obtained by multiplying a number N of the plurality of reception antennas by a distance 2×d, wherein the plurality of reception antennas have an antenna arrangement including at least one part in which reception antennas are arranged with an antenna interval of the distance 2×d, and wherein the virtual reception antennas have the antenna arrangement including at least one part in which a virtual antenna interval is the distance d.

5. A radar system for detecting an object, wherein the radar system is mounted on vehicle or a vessel, the radar system comprising:

two transmit antennas spaced along an array direction at a first spacing of 3×d, wherein d is one half a wavelength or less;

a number Nr of receive antennas spaced along the array direction at a second spacing of 2×d;

a transmission circuit coupled to the two transmit antennas;

a reception circuit coupled to the Nr receive antennas; and a signal processor coupled to the transmission circuit and to the reception circuit, wherein the transmission circuit, under the control of the signal processor, is configured to send first and second chirp waveforms over the two transmit antennas, thereby realizing a virtual antenna arrangement of 2×Nr virtual antennas arranged along the array direction, wherein the signal processor is configured to apply a two dimensional fast Fourier transform to an output of the reception circuit and obtain a bearing of the object, thereby detecting the object using a beam, and wherein the virtual antenna arrangement comprises:

2×Nr−2 virtual receive antennas spaced at a spacing d along the array direction, a first virtual receive antenna at a distance 2×d to the left along the array direction of a leftmost of the 2×Nr−2 virtual receive antennas, and a second virtual receive antenna at a distance 2×d to the right along the array direction of a rightmost of the 2×Nr−2 virtual receive antennas.

* * * * *